United States Patent [19]

Santén et al.

[11] 4,455,165

[45] Jun. 19, 1984

[54] INCREASING BLAST TEMPERATURE

[75] Inventors: Sven Santén; Börje Johansson, Hofors, both of Sweden

[73] Assignee: SKF Steel Engineering AB, Sweden

[21] Appl. No.: 497,853

[22] Filed: May 25, 1983

[30] Foreign Application Priority Data

Jun. 9, 1982 [SE] Sweden .............................. 8203563

[51] Int. Cl.³ .............................................. C21B 5/00
[52] U.S. Cl. ...................................... 75/10 R; 75/11; 75/41
[58] Field of Search ...................... 75/10 R, 41, 11, 12

[56] References Cited

U.S. PATENT DOCUMENTS 3,970,290   7/1976   Santen ..................................... 75/11

Primary Examiner—Peter D. Rosenberg
Attorney, Agent, or Firm—Brumbaugh, Graves, Donohue & Raymond

[57] ABSTRACT

In a method of utilizing a plasma generator to increase the blast temperature in a shaft furnace for melting and possible reduction of metals and/or metal oxides, the thermal energy produced in the plasma generator is transferred, in order essentially to prevent the formation of nitrogen oxide, from the plasma generator to the blast gas via a gas which is inert or oxidizing in relation to the metal to be processed, the product of the oxygen mol fraction and the nitrogen mol fraction in the gas used being less than or equal to 0.02.

5 Claims, 3 Drawing Figures

INCREASING BLAST TEMPERATURE

BACKGROUND TO THE INVENTION

The present invention relates to increasing blast temperatures, and more specifically to a method of using a plasma generator to increase the blast temperature in a shaft furnace for melting and possible reduction of metals and/or metal oxides.

It has long been known that by increasing the blast temperature in a blast-furnace it is possible to reduce the coke consumption and at the same time increase production. Furthermore, at blast temperatures above 850° C., oil can be injected in tuyeres, thus achieving an additional saving in coke. The yield coefficient for oil is about 2 kg coke/kg oil for the first addition of oil. However, when more oil is added and constant blast temperature is maintained, this yield coefficient falls to a value of about 1 kg coke/kg oil. No further increase of the oil quantity is possible above a certain quantity since the combustion temperature in front of the tuyeres would be too low, and this would in any case entail reduced production.

These factors prompted attempts to increase the blast temperature as much as possible. However, increased blast temperature also enables the injection of fuels other than oil, such as coal dust or coke breeze, slurries of coal or coke in oil or water, natural gas, gas from coking plants, etc. Other additives can also be used at high blast temperatures, such as oxidic material e.g. water, iron ore, flue-gas dust are prereduced iron oxides as well as slag-formers.

An effective way of achieving the desired increase in blast temperature is to utilize the PLASMABLAST® method, according to which part or all the blast air is led through a plasma.

However, there are certain drawbacks entailed with this method in that the tuyeres often collapse for inexplicable reasons.

The object of the present invention is thus to eliminate the drawbacks of this known method.

SUMMARY OF THE INVENTION

The present invention provides a method of increasing the blast temperature in a shaft furnace for melting and possible reduction of metals and/or metal oxides, using a plasma generator, wherein the thermal energy produced in the plasma generator is transferred, in order essentially to prevent the formation of nitrogen oxide, from the plasma generator to the blast gas via a gas which is inert or oxidizing in relation to the metal to be processed, the product of the oxygen mol fraction and the nitrogen mol fraction in the gas used being less than or equal to 0.02.

According to an alternative embodiment of the invention, there is provided a method of melting and optionally reducing metals and/or metal oxides in a shaft furnace wherein a plasma generator is used to increase the blast temperature in the shaft furnace, the thermal energy produced in the plasma generator being transferred, in order essentially to prevent the formation of nitrogen oxide, from the plasma generator to the blast gas via a gas which is inert or oxidizing in relation to the metal being processed, the product of the oxygen mol fraction and the nitrogen mol fraction in the gas used being less than or equal to 0.02.

However, in extensive practical experiments with this method, as mentioned earlier a considerable number of tuyere collapses occurred which were difficult to explain. A thorough study of these collapses revealed surprisingly that they were caused by the massive quantities of nitrogen oxides which can be formed in the PLASMABLAST® process. Admittedly, the nitrogen oxides which pass up through the furnace shaft are disintegrated and at least do not give rise to the problems mentioned above. However, nitrogen oxides are dissolved to a certain extent in condensed water on the water-cooled tuyere, thus giving rise to extensive corrosion and subsequent collapse.

By means of the present invention all the advantages of the PLASMABLAST® process can be utilized, without the occurrence of disturbances in operation.

The plasma generator is extremely efficient, usually above 85% efficiency, as well as being relatively insensitive to temperature. The gas leaving normally has a temperature in the order of 3000°–4000° C.

Since the temperature of the blast gas supplied to the tuyeres can be simply and efficiently regulated by means of the plasma generator, a new control variable is also obtained in blast furnace operation. When a blast furnace is being run cold, for instance, the quantity of energy supplied through the tuyeres may be increased so that a considerably quicker change in the energy balance of the blast furnace is obtained than can be achieved by increasing the coke feed, which has hitherto been the normal procedure.

BRIEF DESCRIPTION OF THE DRAWINGS

The invention will be described further in the following, with reference to the accompanying drawings, in which.

DETAILED DESCRIPTION OF THE INVENTION

Figure 1:
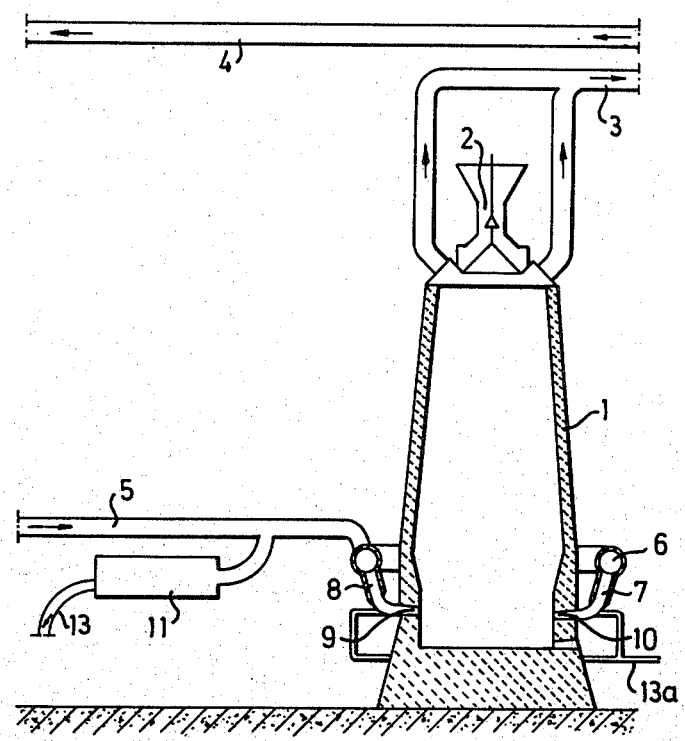
FIG. 1 shows a basic sketch of the PLASMABLAST® process.

FIG. 1 thus shows a basic sketch of the PLASMABLAST® process applied to a blast furnace 1 supplied in conventional manner through an opening 2. The gas leaving the blast furnace is led through the pipe 3 to a gas-purifier, not shown. From the gas-purifier it is preferably supplied via the pipe 4 to a heat-exchanger, not shown either, e.g. a Cowper apparatus, and is then released through a chimney. The blast air entering, preferably pre-heated, is led via the pipe 5 to an annular drum 6 arranged around the blast furnace shaft, from whence it is led into the blast furnace via a number of branch pipes 7, 8 and tuyeres 9, 10.

To enable an increase in the temperature of the blast gas supplied a plasma generator 11 is utilized, which is shunt-connected to the pipe 5 in the embodiment shown here. A gas passes through the plasma generator in a pipe 13 provided with a control valve. This enables accurate control of the temperature and quantity of blast gas supplied to the blast furnace. A pipe 13a for the introduction of carbon, hydrocarbon, coke furnace gas, water or the like into the tuyeres is connected to the lower part of the blast furance.

The embodiment shown in FIG. 1 is suitable when the blast gas is not to be heated to more than about 1500° C. For blast temperatures higher than this the plasma generator is preferably placed in the immediate vicinity of the tuyere, e.g. as shown in FIG. 2, partly to reduce the thermal stress in the blast gas piping system and partly to reduce heat losses.

Figure 2:
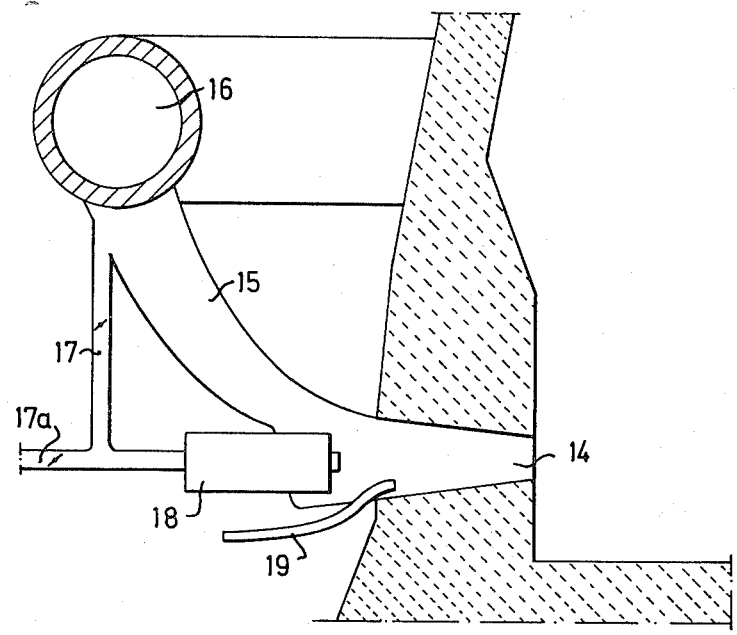
FIG. 2 shows one embodiment of the invention.

FIG. 2 shows part of the bottom section of a blast furnace connected to a tuyere 14, to which a branch pipe 15 leads from an annular drum 16 of the same type as that shown in FIG. 1.

According to a preferred embodiment of the invention, the gas used to transfer the thermal energy produced by the plasma generator consists of exhaust gas recirculated from the top of the reactor.

The blast gas may also consist of gas from the top of the shaft, in which case the plasma generator may be included in a shunt-conduit of the type shown in FIG. 1. If desired, gas may be supplied through the supply pipe 13 from some other source provided it fulfils the criteria stipulated in accordance with the invention, i.e. that the product of the oxygen mol fraction and the nitrogen mol fraction in the gas used shall be less than or equal to 0.02.

The plasma generator is preferably placed as shown in FIG. 2, some of the blast gas coming from the annular drum being in this case led via a pipe 17 through a plasma generator 18 with its outlet in the pipe and directed inwardly towards the tuyere 14. A second pipe 17a for the supply of a plasma gas other than the blast gas may be arranged with its orifice in the pipe 17 in front of the plasma generator. A pipe 19 for the supply of hydrocarbon, for instance, in the heated blast gas is inserted in the pipe 15 in front of the opening to the plasma generator, the hydrocarbon jet being directed towards the tuyere.

Figure 3:
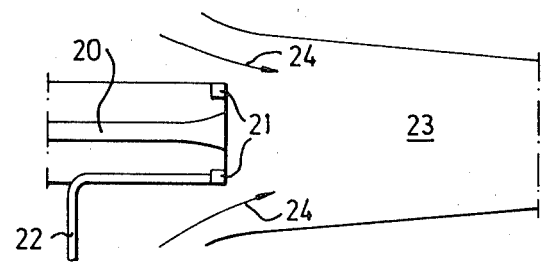
FIG. 3 shows a suitable embodiment of a nozzle for blowing in blast gas and e.g. oil or coal dust into the furnace.

As for the oil injection, this can be performed in substantially the same way as in most of today's blast furnaces. An advantageous design of the nozzle for the spraying in of carbon, hydrocarbon, coke furnace gas, water or the like, as well as hot gas from a plasma generator into a blast furnace is shown in FIG. 3. An annular nozzle 21, provided with a number of holes for spraying in of oil, is arranged around the exhaust pipe 20 from the plasma generator, the oil being supplied through the pipe 22. Oil, plasma gas from the plasma generator and any blast gas which has not passed this, see arrows 24, are then mixed in the tuyere 23.

The invention is illustrated further by the following Example.

The invention was tested in a plant with a production capacity of ca. 30 tons of crude iron per 24-hour period.

1080 m$^3$(n) air preheated to 900° C. was supplied to the plant as blast gas per ton of crude iron and 60 m$^3$(n) cold top gas and 330 kWh in the form of electricity were supplied to the plasma generator. Furthermore, 190 kg coal dust was added after the plasma generator, thus saving 240 kg of the 560 kg coke/ton produced crude iron normally consumed.

An increase in production of ca. 24% is obtained in comparison with conventional methods in which the blast temperature is ca. 900° C.

We claim:

1. In a method of supplying heated blast gas to a shaft furnace containing metal or metal oxide so as to melt or reduce said metal or metal oxide, said method including the steps of heating at least a portion of said blast gas by means of a plasma generator and thereafter injecting said heated blast gas into said shaft furnace by means of tuyeres communicating with the interior of the furnace, the improvement comprising selecting a blast gas such that substantially no nitrogen oxide will be permitted to contact the tuyeres and further selecting said blast gas such that it is inert or oxidizing toward the metal to be melted or reduced and such that the product of the mol fractions or oxygen and nitrogen in the heated blast gas is less than or equal to 0.02.

2. A method according to claim 1 wherein the blast gas heated by the plasma generator is comprised at least partially of top gas recirculated from the shaft furnace.

3. A method according to claim 1 including the step of mixing an additional gas with the heated blast gas before the blast gas is injected into the shaft.

4. A method according to claim 3 wherein said additional gas includes air.

5. A method according to claim 1 including the step of mixing carbonaceous fuel with the heated blast gas before the blast gas is injected into the shaft.

* * * * *

UNITED STATES PATENT AND TRADEMARK OFFICE
CERTIFICATE OF CORRECTION

PATENT NO. : 4,455,165

DATED : June 19, 1984

INVENTOR(S) : Sven Santen and Börje Johansson

It is certified that error appears in the above-identified patent and that said Letters Patent is hereby corrected as shown below:

Column 1, line 31, "are" should be --and--. Column 4, line 30, "fractions or" should be --fractions of--.

Signed and Sealed this

Twenty-third Day of October 1984

[SEAL]

Attest:

GERALD J. MOSSINGHOFF

Attesting Officer     Commissioner of Patents and Trademarks